United States Patent
Santhanam et al.

(10) Patent No.: US 9,982,064 B2
(45) Date of Patent: May 29, 2018

(54) PROCESS FOR PREPARING AN INHIBITED STARCH

(71) Applicant: TATE & LYLE INGREDIENTS AMERICAS LLC, Hoffman Estates, IL (US)

(72) Inventors: Balaji Santhanam, Saint Charles, IL (US); Thomas K. Hutton, Lafayette, IN (US)

(73) Assignee: TATE & LYLE INGREDIENTS AMERICAS LLC, Hoffman Estates, IL (US)

( * ) Notice: Subject to any disclaimer, the term of this patent is extended or adjusted under 35 U.S.C. 154(b) by 244 days.

(21) Appl. No.: 14/432,919

(22) PCT Filed: Oct. 2, 2013

(86) PCT No.: PCT/GB2013/052569
§ 371 (c)(1),
(2) Date: Apr. 1, 2015

(87) PCT Pub. No.: WO2014/053833
PCT Pub. Date: Apr. 10, 2014

(65) Prior Publication Data
US 2015/0239994 A1  Aug. 27, 2015

Related U.S. Application Data

(60) Provisional application No. 61/708,841, filed on Oct. 2, 2012.

(51) Int. Cl.
*C08B 30/12* (2006.01)
*A23L 1/277* (2006.01)
(Continued)

(52) U.S. Cl.
CPC ............... *C08B 30/12* (2013.01); *A23L 5/25* (2016.08); *A23L 5/49* (2016.08); *A23L 29/212* (2016.08);
(Continued)

(58) Field of Classification Search
None
See application file for complete search history.

(56) References Cited

U.S. PATENT DOCUMENTS

| 1,937,543 A | 12/1933 | Bryant |
| 2,108,862 A | 2/1938 | Kerr |

(Continued)

FOREIGN PATENT DOCUMENTS

| CN | 1326994 | 12/2001 |
| CN | 1827650 | 9/2006 |

(Continued)

OTHER PUBLICATIONS

Chinese Office Action dated Feb. 29, 2016 for Chinese Application No. 201380059331.6 with partial translation.
(Continued)

*Primary Examiner* — Nikki H. Dees
*Assistant Examiner* — Stephanie A Cox
(74) *Attorney, Agent, or Firm* — RatnerPrestia

(57) ABSTRACT

The present invention provides a process for preparing an inhibited starch comprising, in order: a) extracting starch from a native source and partially refining to provide a partially refined starch having a residual protein content on a dry starch basis of more than 0.4% by weight and less than 8.0% by weight; b) treating said partially refined starch with a bleaching agent to provide an inhibited starch; and c) recovering said inhibited starch.

24 Claims, 4 Drawing Sheets

(51) Int. Cl.
| | |
|---|---|
| *A23L 1/0522* | (2006.01) |
| *A23L 1/015* | (2006.01) |
| *C08B 30/14* | (2006.01) |
| *C08B 30/04* | (2006.01) |
| *C08B 30/18* | (2006.01) |
| *C08B 31/00* | (2006.01) |
| *C08L 3/04* | (2006.01) |
| *A23L 5/20* | (2016.01) |
| *A23L 29/212* | (2016.01) |
| *A23L 29/219* | (2016.01) |
| *A23L 29/30* | (2016.01) |
| *A23L 5/49* | (2016.01) |

(52) U.S. Cl.
CPC ............ *A23L 29/219* (2016.08); *A23L 29/35* (2016.08); *C08B 30/04* (2013.01); *C08B 30/14* (2013.01); *C08B 30/18* (2013.01); *C08B 31/003* (2013.01); *C08L 3/04* (2013.01); *A23V 2002/00* (2013.01)

(56) References Cited

U.S. PATENT DOCUMENTS

| | | | |
|---|---|---|---|
| 2,317,752 | A | 4/1943 | Fuller |
| 2,332,320 | A | 10/1943 | Kerr |
| 2,354,838 | A | 8/1944 | Schopmeyer |
| 2,409,084 | A | 10/1946 | Vincent |
| 2,438,855 | A | 3/1948 | Kerr |
| 2,620,281 | A | 12/1952 | Hervert |
| 2,624,681 | A | 1/1953 | Rapp |
| 2,805,220 | A | 9/1957 | Gerwitz |
| 2,870,063 | A | 1/1959 | De La Mater |
| 2,963,442 | A | 12/1960 | Erickson |
| 2,989,521 | A | 6/1961 | Senti |
| 3,037,931 | A | 6/1962 | Gayhardt |
| 3,087,839 | A | 4/1963 | Hamilton |
| 3,463,668 | A | 8/1969 | Evans |
| 3,515,718 | A | 6/1970 | Mehltretter |
| 3,607,393 | A | 9/1971 | Gabel |
| 3,615,786 | A | 10/1971 | Moskaluk |
| 4,013,799 | A | 3/1977 | Smalligan |
| 4,055,554 | A | 10/1977 | Helmstetter |
| 4,072,535 | A | 2/1978 | Short |
| 4,131,574 | A | 12/1978 | Isherwood |
| 4,231,803 | A | 11/1980 | Bovier |
| 4,268,628 | A | 5/1981 | Klose |
| 4,281,111 | A | 7/1981 | Hunt |
| 4,368,212 | A | 1/1983 | Heckman |
| 4,369,308 | A | 1/1983 | Trubiano |
| 4,549,909 | A | 10/1985 | Samuel |
| 5,336,328 | A | 8/1994 | Mauro |
| 5,385,608 | A | 1/1995 | Fitt |
| 5,641,349 | A | 6/1997 | Koubek |
| 5,718,770 | A | 2/1998 | Shah |
| 5,830,884 | A | 11/1998 | Kasica |
| 5,871,756 | A | 2/1999 | Jeffcoat |
| 5,932,017 | A | 8/1999 | Chiu |
| 5,959,102 | A * | 9/1999 | Wasserman ............ C08B 30/04 127/65 |
| 6,010,574 | A | 1/2000 | Jeffcoat |
| 6,162,474 | A | 12/2000 | Chen |
| 6,221,420 | B1 | 4/2001 | Thomas |
| 6,235,894 | B1 | 5/2001 | Kettlitz |
| 6,261,376 | B1 | 7/2001 | Jeffcoat |
| 6,451,121 | B2 | 9/2002 | Chiu |
| 6,663,909 | B2 | 12/2003 | Sarneel |
| 6,777,548 | B1 | 8/2004 | Kesselmans |
| 7,605,254 | B2 * | 10/2009 | McClain ................ C08B 30/18 536/102 |
| 2007/0039612 | A1 | 2/2007 | Veelaert |

FOREIGN PATENT DOCUMENTS

| | | |
|---|---|---|
| CN | 101189267 | 5/2008 |
| EP | 0499306 | 8/1992 |
| EP | 0721471 | 7/1996 |
| EP | 0811633 | 12/1997 |
| EP | 0823439 | 2/1998 |
| EP | 0966889 | 12/1999 |
| EP | 1692948 | 8/2006 |
| JP | H05132401 | 5/1993 |
| JP | H07106377 | 11/1995 |
| WO | 9504082 | 2/1995 |
| WO | 9603891 | 2/1996 |
| WO | 9603892 | 2/1996 |
| WO | 9900425 | 1/1999 |
| WO | 03061404 | 7/2003 |
| WO | 2004084640 | 10/2004 |
| WO | 2005026212 | 3/2005 |
| WO | 2005100407 | 10/2005 |
| WO | 2009053337 | 4/2009 |

OTHER PUBLICATIONS

Great Britain Search Report for Great Britain Application No. GB1220077.0 dated Mar. 5, 2013.
International Preliminary Report on Patentability and Written Opinion for International Application No. PCT/GB2013/052569 dated Apr. 7, 2015.
International Search Report dated Nov. 27, 2013 for International Application No. PCT/GB2013/052569.
Irving Martin, "Crosslinking of Starch by Alkaline Roasting" Journal of Applied Polymer Science, vol. II, issue 7, Jul. 1967, pp. 1283-1288.
Russell, P.L., "A study of ESCA of the surface of native and chlorine-treated wheat starch granules: The effects of various surface treatments," 1987, pp. 83-100, vol. 5(1), Journal of Cereal Science.
Seguchi, M., "Comparison of oil-binding ability of different chlorinated starches," 1984, pp. 241-244, vol. 61(3), Cereal Chemistry.

* cited by examiner

PROCESS FOR PREPARING AN INHIBITED STARCH

CROSS-REFERENCE TO RELATED APPLICATIONS

This application is a national phase of International Application No. PCT/GB 2013/052569, filed Oct. 2, 2013, which claims priority of U.S. Provisional Application No. 61/708,841, filed Oct. 2, 2012. The disclosures of each of these applications are incorporated herein by reference in their entirety for all purposes.

The present invention provides a process for preparing an inhibited starch. The present invention also provides an inhibited starch obtainable by the process according to the present invention, a use of the inhibited starch for the preparation of a food product and a food product comprising the inhibited starch.

Starch is a very important ingredient in the food industry, for example as a thickening agent or stabiliser. Natural, unmodified starches (known as "native" starches) have a number of disadvantages when used in such applications.

The thickening properties of starch are the result of the hydration and swelling of starch granules when an aqueous starch suspension is heated, which causes the viscosity of the starch suspension to increase. However, the swollen, hydrated granules are not stable, and are thus liable to bursting. Accordingly, after an initial peak in viscosity, the viscosity of native starch suspensions quickly decreases again. This is particularly the case in the presence of shear and/or under acidic conditions.

In most food applications, it is undesirable for the viscosity of a thickened product to decrease again after reaching an initial peak. Instead, it is usually desirable for the viscosity of a thickened product to remain stable or to further increase over time, even in the presence of shear and/or under acidic conditions.

Many attempts have been made to improve the properties of native starch such that it is able to provide the viscosity stability, shear tolerance and acid tolerance required in many food applications. Starch whose properties have been improved in this way is often referred to as "inhibited starch" or "stabilised starch". Generally, the inhibition or stabilisation of the starch is attributed to the formation of cross-links and/or intermolecular bridges between the polysaccharides.

Stabilised starches can be produced very successfully by using chemical cross-linking reagents such as phosphorus oxychloride, sodium trimetaphosphate and epichlorohydrin. Stabilised starches produced in this manner are generally referred to as "chemically-modified starches". These chemically-modified starches are able to offer the required properties in terms of viscosity stability, shear tolerance and add tolerance.

One successful alternative approach to producing inhibited starch is by alkaline dry roasting ("thermally inhibited starch"). Examples of alkaline dry roasting methods can be found in EP0721471 B1 and in Irving Martin, "Crosslinking of Starch by Alkaline Roasting", Journal of Applied Polymer Science, vol. II, 1967, pages 1283-1288.

Low levels of bleaching agents have also been used to inhibit starch to some extent. However, the degree of inhibition that can be obtained in this way is limited since, unlike in the case of chemical cross-linking reagents (such as phosphorus oxychloride, sodium trimetaphosphate and epichlorohydrin), it is not possible to increase the degree of inhibition simply by increasing the concentration of the bleaching agent. This is because high concentrations of bleaching agent cause depolymerisation of the starch. In addition to the fact that only very mild inhibition is possible, a further disadvantage with this approach is that the resulting starches have significantly reduced acid and shear tolerance.

It has now been found that a highly inhibited starch can be produced using bleaching agents, with advantageous properties in terms of viscosity stability, shear tolerance and acid tolerance.

SUMMARY OF INVENTION

According to a first aspect, the present invention provides a process for preparing an inhibited starch comprising, in order:

a) extracting starch from a native source and partially refining to provide a partially refined starch having a residual protein content on a dry starch basis of more than 0.4% by weight and less than 8.0% by weight;

b) treating said partially refined starch with a bleaching agent to provide an inhibited starch; and c) recovering said inhibited starch.

According to a preferred embodiment, the process further comprises, after said bleaching b):

b') treating the inhibited starch with a protease to remove residual protein.

In a preferred embodiment, the residual protein content on a dry starch basis of the partially refined starch is more than 1.0% by weight. In a further preferred embodiment, the residual protein content on a dry starch basis of the partially refined starch is less than 4.0% by weight. In a particularly preferred embodiment, the residual protein content on a dry starch basis of the partially refined starch is more than 1.2% by weight and less than 3.0% by weight, or more than 1.3% by weight and less than 2.5% by weight.

According to an embodiment, the partially refined starch having a residual protein content on a dry starch basis of more than 0.4% by weight and less than 8.0% by weight is obtained by mixing two or more starch streams of differing residual protein contents. For example, a partially refined starch stream is mixed with a refined starch stream.

According to a preferred embodiment, the native source is waxy. Preferably the native source is selected from the group consisting of waxy maize (corn), waxy rice, waxy wheat, waxy sorghum, waxy barley and waxy potato. More preferably, the native source is waxy maize (corn).

The bleaching agent preferably comprises a source of active chlorine. In a preferred embodiment, the bleaching agent comprises hypochlorite, for example an alkali metal or alkaline earth metal hypochlorite. In a particularly preferred embodiment, the hypochlorite is sodium hypochlorite.

According to a second aspect, the present invention provides an inhibited starch obtainable by the process according to the first aspect.

According to a third aspect, the present invention provides the use of an inhibited starch according to the second aspect for the preparation of a food product. In a preferred embodiment, the food product is an acidic food product.

According to a fourth aspect, the present invention provides a food product comprising an inhibited starch according to the second aspect, i.e. comprising an inhibited starch obtainable, or obtained, by the process of the present invention. In a preferred embodiment, the food product is an acidic food product.

DETAILED DESCRIPTION

Figure 1:
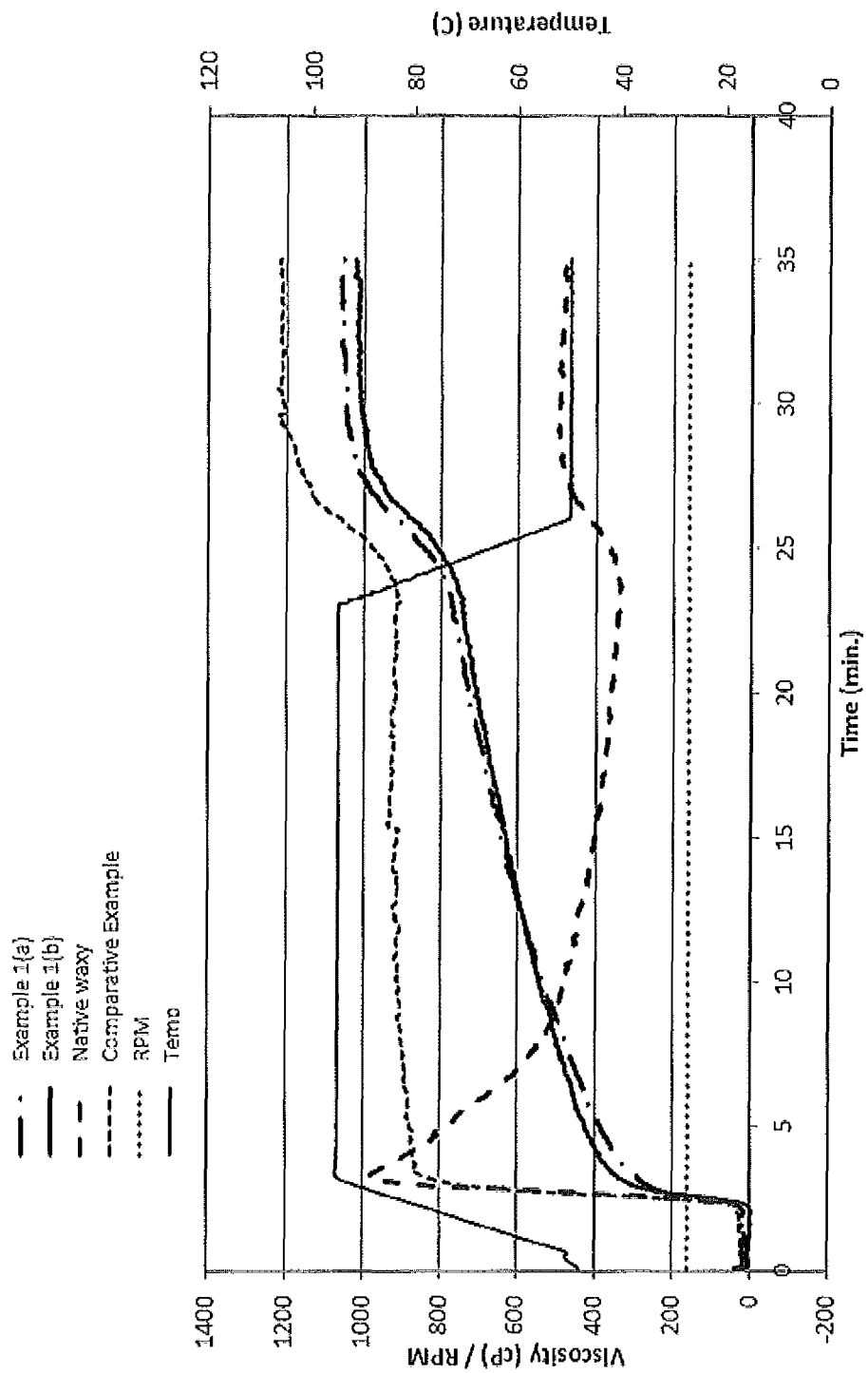
FIG. 1 shows the viscosity profiles for inhibited starch produced according to Example 1(a), protease-treated inhibited starch produced according to Example 1(b), starch produced according to the Comparative Example, and native waxy starch at pH 6.5.

According to a first aspect, the present invention provides a process for preparing an inhibited starch comprising, in order:

a) extracting starch from a native source and partially refining to provide a partially refined starch having a residual protein content on a dry starch basis of more than 0.4% by weight and less than 8.0% by weight;

b) treating said partially refined starch with a bleaching agent to provide an inhibited starch; and c) recovering said inhibited starch.

Native starch is recovered from native sources (cereals, vegetables and the like) by well-known processes such as wet-milling. These processes extract starch from a native source and then refine the starch to remove natural impurities such as proteins, lipids and other carbohydrates. The product of these processes is refined native starch, usually referred to simply as "native starch".

The most commonly used native source is corn (maize). The process for recovering corn starch from corn is known as "wet-milling". A typical wet-milling process has the following basic steps:

1. Cleaning—Dust and foreign bodies are removed from the shelled corn;
2. Steeping—The cleaned corn is soaked in water, called steepwater, at about 50° C. for between 20 and 30 hours, during which time it doubles in size. Sulphur dioxide is added to the water to prevent excessive bacterial growth. As the corn swells and softens, the mildly acidic steepwater starts to loosen the gluten bonds with the corn, and to release the starch;
3. Milling and separation—The steeped corn is coarsely milled in cracking mills to separate the germ from the rest of the components (including starch, fibre and gluten). Now in a form of slurry, the corn flows to germ or 'cyclone' separators to separate out the corn germ;
4. Fine grinding and screening—The remaining slurry leaves the separation step for fine grinding. After fine grinding, which releases the starch and gluten from the fibre, the slurry flows over fixed concave screens which catch the fibre but allow the starch and gluten to pass through. The starch-gluten suspension is then sent to starch separators;
5. Separating the starch and gluten—The starch-gluten suspension passes through a centrifuge where the gluten, which is less dense than starch, is easily spun out;
6. Washing—The starch is washed to remove remaining protein to provide refined starch.

Native starches refined by such processes typically have a very low level of residual protein of around 0.2% by weight dsb (dry starch basis).

According to the present invention, starch is extracted from a native source and is then only partially refined, to provide a partially refined starch having a residual protein content on a dry starch basis of more than 0.4% by weight and less than 8.0% by weight. In other words, starch is removed from an extraction and refining process (such as wet-milling) at an intermediate point, at which the residual protein content remains at a level of more than 0.4% by weight and less than 8.0% by weight (dsb). Thus, for example, starch may be removed from a wet-milling process (such as described above) before, or part way through, the washing step.

According to an embodiment of the present invention, the partially refined starch having a residual protein content on a dry starch basis of more than 0.4% by weight and less than 8.0% by weight may be obtained by combining two or more starch streams of differing residual protein contents, for example starch streams extracted from different stages of a wet-milling process. Thus, for example, a partially refined starch stream with a relatively high residual protein content (such as may be obtained, for example, from a relatively early stage of a wet-mill refining process) may be combined with a refined starch stream (such as may be obtained, for example, as the final product of a wet-mill refining process) to provide a partially refined starch having a residual protein content on a dry starch basis of more than 0.4% by weight and less than 8.0% by weight. According to one embodiment, starch is extracted from a native source and is partially refined to provide a partially refined starch stream; and the partially refined starch stream is combined with a refined starch stream to provide the partially refined starch having a residual protein content on a dry starch basis of more than 0.4% by weight and less than 8.0% by weight.

Although the level of remaining impurities present in the partially refined starch is described in terms of residual protein content, it will be recognised that partially refined starch having the specified residual protein content will usually also contain residual lipids, lactic acid, other carbohydrates and the like. However, it is convenient to refer to the level of residual impurities by reference only to the level of residual protein.

It is an important feature of the present invention that the partially refined starch used in step (b) has only been subjected to extraction and refining steps, such as those described above. The partially refined starch used in step (b) has not been subjected to any additional chemical or enzymatic reaction steps. For example, the partially refined starch used in step (b) has not been treated to convert, or partially convert, organoleptic impurities and/or precursors of organoleptic impurities into non-organoleptic impurities. In particular, the partially refined starch used in step (b) has not been treated with any reagent for hydrolysing and/or oxidatively degrading impurities such as organoleptic impurities and/or precursors of organoleptic impurities. For example, the partially refined starch used in step (b) has not been treated with any reagent such as proteases, lipases, chlorine-free oxidants, alkaline solution, alkaline aqueous solution, and mixtures of these. The residual protein (and other impurities) present in the partially refined starch used in step (b) has not been chemically or enzymatically modified as described above. All of the residual protein (and other impurities) present in the partially refined starch used in step (b) is naturally present and derived from the native source; no additional protein is added to the partially refined starch used in step (b).

It has been found that the degree of inhibition observed when a partially refined starch is subjected to treatment with a bleaching agent is significantly increased compared to the degree of inhibition observed when a fully refined starch is subjected to treatment with a bleaching agent. Thus, without wishing to be bound by theory, it appears that residual protein present in partially refined starch play an important role in the inhibition of starch using a bleaching agent.

The partially refined starch used in step (b) has a residual protein content on a dry starch basis of more than 0.4% by weight and less than 8.0% by weight. A residual protein content of more than 0.4% by weight (dsb) is significantly greater than the residual protein content found in fully refined native starch, which typically has a very low level of residual protein of around 0.2% dsb.

In preferred embodiments of the present invention, the residual protein content of the partially refined starch used in step (b) is more than 0.5% by weight (dsb), more than 0.6% by weight (dsb), more than 0.7% by weight (dsb), more than 0.8% by weight (dsb), more than 0.9% by weight (dsb), or more than 1.0% by weight (dsb). It is particularly preferred that the residual protein content of the partially refined starch used in step (b) be more than 1.0% by weight (dsb).

In preferred embodiments of the present invention, the residual protein content of the partially refined starch used in step (b) is less than 7.0% by weight (dsb), less than 6.0% by weight (dsb), less than 5.0% by weight (dsb), or less than 4.0% by weight (dsb).

In particularly preferred embodiments of the present invention, the residual protein content of the partially refined starch used in step (b) is more than 1.0% by weight (dsb) and less than 4.0% by weight (dsb), for example more than 1.0% by weight (dsb) and less than 3.0% by weight (dsb); more than 1.1% by weight (dsb) and less than 3.5% by weight (dsb); more than 1.2% by weight (dsb) and less than 3.0% by weight (dsb); or more than 1.3% by weight (dsb) and less than 2.5% by weight (dsb).

As used in the present invention, "protein content" means the protein content as determined using the Kjeldahl method, or any equivalent method. According to the Kjeldahl method, a % nitrogen content (by weight, dsb) is determined and is then multiplied by a conversion factor in order to calculate the % protein content (by weight, dsb). The conversion factor depends on the native source. In the case of corn (maize), the conversion factor is 6.25. The Kjeldahl method and relevant conversion factors are well known to those skilled in the art.

Any native source can be used according to the present invention, including both waxy and non-waxy sources. Examples of suitable native sources include maize (corn), barley, wheat, tapioca, rice, sago, amaranth, sorghum, arrowroot, potato, sweet potato, pea, banana, waxy maize (corn), waxy barley, waxy wheat, waxy rice, waxy sorghum and waxy potato.

Waxy sources are generally preferred. Thus, preferred sources include waxy maize (corn), waxy rice, waxy wheat, waxy sorghum, waxy barley and waxy potato. A particularly preferred source is waxy maize (corn).

The bleaching agent used in step (b) of the process according to the present invention preferably comprises a source of active chlorine. A convenient source of active chlorine for use in the present invention is hypochlorite, such as alkali metal or alkaline earth metal hypochlorites. Thus, preferred hypochlorites include sodium, potassium, calcium and magnesium hypochlorites. Sodium hypochlorite is particularly preferred.

Although hypochlorite is a particularly convenient source of active chlorine for use in the present invention, other sources of active chlorine may also be contemplated. Examples of such other sources include reagents which are able to generate active chlorine in situ. Other suitable bleaching agents include alkali metal chlorites and chlorine dioxide. The present invention also encompasses the use of mixed bleaching agents, for example appropriate mixtures of any two or more of the bleaching agents exemplified above.

The amount of bleaching agent to be used in step (b) will usually be selected such that it provides from around 0.25 to around 3 weight % of active chlorine, relative to the amount of partially refined starch, on a dry starch basis. For example, the amount of bleaching agent to be used may be selected such that it provides from around 0.35 to around 2.5 weight %, around 0.45 to around 2.2 weight %, or around 0.5 to around 2 weight % of active chlorine, relative to the amount of partially refined starch, on a dry starch basis.

The treatment of the partially refined starch with a bleaching agent is preferably carried out on an aqueous slurry of the partially refined starch. Advantageously, the aqueous slurry may be an aqueous slurry obtained directly from an intermediate point in the starch refining process, for example from one of the starch washing steps at the washing stage of a wet-mill process. The starch content of the aqueous slurry is not critical, but may be in the range of from about 10 weight % (dsb) to about 70 weight % (dsb), from about 20 weight % (dsb) to about 60 weight % (dsb), or from about 30 weight % (dsb) to about 50 weight % (dsb). A slurry containing around 40 weight % starch (dsb) is particularly suitable.

It is preferable to adjust the pH of the slurry prior to the addition of bleaching agent, and to then maintain the pH during the treatment with the bleaching agent. For example, the pH prior to the addition of any bleaching agent may be adjusted to about 7 to about 9, for example about 8.5, and the pH during the treatment with the bleaching agent may be maintained within a range of about 9 to about 10, for example about 9.5. The adjustment and maintenance of the pH may be achieved by addition of a suitable alkali. An aqueous solution of an alkali metal hydroxide such as sodium hydroxide may be used, for example.

The temperature of the slurry during the treatment with a bleaching agent is preferably maintained in a range of from about 30 to about 50° C., for example about 40° C. The treatment with a bleaching agent is preferably carried out for a period of time of from around 30 minutes to around 4 hours, for example from around 1 hour to around 3 hours, or around 1.5 hours.

Following the treatment with a bleaching agent, the pH of the slurry is preferably adjusted to around 8 using a suitable acid such as sulfuric acid. Residual bleaching agent is then preferably deactivated using a suitable reagent such as sodium metabisulfite.

Following the treatment with a bleaching agent, the inhibited starch can be recovered from the slurry. This may be achieved by filtering the slurry to obtain a starch cake, washing the starch cake with water, and then drying the wet cake. The drying may be carried out at a temperature of about 50° C., for example overnight in an oven. Preferably, the temperature during the drying step does not significantly exceed about 50° C. For example, a suitable maximum temperature may be around 70° C., about 60° C., or about 50° C.

Following drying, the dried starch cake may be pulverised and screened as required.

According to an advantageous embodiment of the present invention, the process further comprises treating the inhibited starch with a protease to remove residual protein remaining after the treatment with the bleaching agent. It has been found that such a protease treatment can significantly improve certain properties of the final, inhibited starch product. For example, a protease treatment step may be used to improve the organoleptic properties of the final inhibited starch product, such as palatability, odour and colour.

Where a protease treatment is included in the process of the present invention, it is essential that this be carried out after step (b), i.e. after the treatment with a bleaching agent. Usually, it will be expedient to carry out the protease treatment on a slurry of the washed starch obtained after step (b), but it is also possible to re-slurry a recovered and dried starch obtained after step (b).

The starch content of the aqueous slurry to be used for the protease treatment may be the same as described above for the bleach treatment step. Thus, a slurry containing around 40 weight % starch (dsb) is particularly suitable.

The enzyme for use in the protease treatment is preferably a food grade protease. An example of a suitable protease is Alcalase™ (Novozymes NS). Other suitable proteases known to those skilled in the art may also be used.

The protease treatment step is preferably carried out at a temperature of from about 45° C. to about 55° C., for example at about 50° C. The pH is preferably adjusted to about 8 prior to the addition of protease, and is maintained at that level during the protease treatment. The adjustment and maintenance of the pH may be achieved by addition of a suitable alkali. An aqueous solution of an alkali metal hydroxide such as sodium hydroxide may be used, for example.

The treatment with a protease is preferably carried out for a period of time of from around 30 minutes to around 1.5 hours, for example for around 1 hour.

Following the protease treatment, the slurry temperature is preferably lowered, for example to about 30° C., and the pH is lowered in order to deactivate the protease. An appropriate pH for the deactivation is around 3, and an appropriate period of time for the deactivation reaction is around 30 minutes to around 1 hour, for example around 45 minutes.

Following deactivation of the protease, the inhibited starch may be recovered in the same manner as already described above. Thus, the protease-treated inhibited starch may be recovered by filtering the slurry to obtain a starch cake, washing the starch cake with water, and then drying the wet cake. The drying may be carried out at a temperature of about 50° C., for example overnight in an oven. Preferably, the temperature during the drying step does not significantly exceed about 50° C. For example, a suitable maximum temperature may be around 70° C., about 60° C., or about 50° C. Following drying, the dried starch cake may be pulverised and screened as required.

The inhibited starch obtained according to the present invention exhibits an excellent degree of inhibition, as well as excellent shear and acid tolerance. The acid-tolerance of the inhibited starch obtained according to the present invention is particularly advantageous, and is significantly improved compared to that of prior art native starches (protein content prior to bleaching of around 0.2 wt % dsb) that have been subjected to a mild bleaching treatment.

In view of its high degree of inhibition, as well as excellent shear and acid tolerance, the inhibited starch prepared according to the present invention is particularly suitable for use in a wide range of food applications, especially food applications where acid and shear tolerance are required.

Food products wherein the inhibited starches according to the present invention are useful include thermally-processed foods, acid foods, dry mixes, refrigerated foods, frozen foods, extruded foods, oven-prepared foods, stove top-cooked foods, microwaveable foods, full-fat or fat-reduced foods, and foods having a low water activity. Food products wherein the inhibited starches are particularly useful are foods requiring a thermal processing step such as pasteurization, retorting, or ultra high temperature (UHT) processing. The inhibited starches are particularly useful in food applications where stability is required through all processing temperatures including cooling, freezing and heating.

The inhibited starches are also useful in food products where a traditionally crosslinked starch thickener, viscosifier, gelling agent, or extender is required or desirable. Based on processed food formulations, those skilled in the art may readily select the amount of inhibited starch required to provide the necessary thickness and gelling viscosity in the finished food product, as well as the desired texture. Typically, the starch is used in an amount of from about 0.1 to about 35%, for example from about 2 to about 6%, by weight, of the food product.

Among the food products which may be improved by the use of the inhibited starches of the present invention are high acid foods (pH<3.7) such as fruit-based pie fillings, baby foods, and the like; acid foods (pH 3.7-4.5) such as tomato-based products; low acid foods (pH>4.5) such as gravies, sauces, and soups; stove top-cooked foods such as sauces, gravies, and puddings; instant foods such as puddings; pourable and spoonable salad dressings; refrigerated foods such as dairy or imitation dairy products (e.g., yogurt, sour cream, and cheese); frozen foods such as frozen desserts and dinners; microwaveable foods such as frozen dinners; liquid products such as diet products and hospital foods; dry mixes for preparing baked goods, gravies, sauces, puddings, baby foods, hot cereals, and the like; and dry mixes for predusting foods prior to batter cooking and frying. The inhibited starches are also useful in preparing food ingredients such as encapsulated flavours and clouds.

In addition to the above-mentioned food applications, the Inhibited starches prepared in accordance with the present invention may also be used in various non-food end use applications where chemically modified (crosslinked) inhibited starches have conventionally been utilised, such as cosmetic and personal care products, paper, packaging, pharmaceutical formulations, adhesives, and the like.

The invention will now be illustrated by means of the following examples, it being understood that these are intended to explain the invention, and in no way to limit its scope.

EXAMPLES

Example 1(a)

Preparation of an Inhibited Starch According to the Present Invention

In the wet-mill, partially refined waxy corn starch slurry was obtained from one of the several starch-washing steps during the final separation of proteins. This partially refined starch slurry (581.5 g, 38% ds) had a higher protein content (1.47% (dry starch basis)) than the final (i.e. "native") starch (0.2% dsb).

The slurry was transferred to a 1 L RB flask. The contents were warmed to 40° C. using a water bath. The pH of the slurry was adjusted to 8.5 by dropwise addition of NaOH (4% w/w) solution. An 12.89% concentrated sodium hypochlorite solution (21.4 g, 1.25% dsb active chlorine) was added dropwise to the pH adjusted slurry. The reaction pH was adjusted to 9.6 with the same NaOH solution and maintained at that pH throughout the reaction (1.75 h). After completion of the reaction, the slurry pH was adjusted to 8 using 35% w/w $H_2SO_4$, followed by the addition of sodium metabisulfite solution (0.2% dsb) to kill residual bleach. The contents were stirred for 30 min. During the metabisulfite addition, the pH of the slurry dropped to pH 7.5. The total & free chlorine of the reaction mixture was tested with Pool & Spa tests strip and was less 1 ppm). The slurry was then filtered and the starch cake was washed with DI water (500 ml×2). The wet cake was dried in an oven at 50° C. overnight. The dried starch was pulverized using a coffee grinder and screened through a 100 mesh screen.

Example 1(b)

Preparation of a Protease-treated Inhibited Starch According to the Present Invention A 38% w/w starch slurry was prepared by adding DI water (159.5 g) to the final product of Example 1(a) (105.5 g, ds=95%, protein=0.66%). The slurry was transferred to a 0.5 L RB flask and warmed to 50° C. using a water bath. The pH was adjusted to 8.0 using NaOH solution (4% w/w). Novozymes Alcalase protease (2.4 L Food Grade, 0.21 g) was added to the starch slurry. The pH was maintained at 8 during the course of the reaction for 1 h. The bath temperature was lowered to 30° C. and the slurry pH was lowered to 3 using 2N HCl to deactivate the protease enzyme. The deactivation reaction time was 45 min. The slurry was then filtered. The starch cake was washed with water (100 mL×3). The wet cake was dried in an oven at 50° C. overnight. The dried starch was pulverized using a coffee grinder and screened through a 100 mesh screen to afford the final starch product.

Comparative Example

Bleach Treatment of Native Waxy Starch

A 38% starch slurry was prepared by adding a fully-refined native waxy corn starch (229.4 g, 91.1% ds) to DI water (320.4 g). This fully refined starch had a protein content of 0.2% dsb.

The slurry was transferred to a 1 L reaction vessel and warmed to 40° C. using a water bath. The slurry pH was initially adjusted to 8.5 with 1 N NaOH followed by a dropwise addition of a 13.8% w/w sodium hypochlorite solution (3.79 g, 0.25% active chlorine based on dry starch) over a period of 3 min. During this step, the pH of the slurry increased from 8.5 to 9.2. The starch slurry was adjusted to pH 9.5 and maintained at that pH for a period of 1 h and 20 min with the aid of a pH controller. Finally, the slurry was neutralized with 1 N $H_2SO_4$ and filtered using a Buchner funnel. The filtrate tested negative for free chlorine using Pool & Spa test strips. The starch cake was washed with 1 L DI water and the cake was dried overnight in a forced air oven with the temperature set at 50° C. The dried starch was pulverized with a Thomas mill and screened through a 100 mesh screen.

Kjeldahl Analysis:

|  | Kjeldahl Nitrogen (%) | Protein (%) (Kjeldahl Nitrogen × 6.25) |
|---|---|---|
| Exampie 1(a) | 0.106 | 0.663 |
| Exampie 1(b) | 0.024 | 0.150 |

Paste Viscosity Procedure:

A rapid visco-analyser (RVA) (Newport Scientific Pty. Ltd., Warriewood, Australia) was used to analyse paste viscosity of the samples at pH 6.5 & 3.5 buffer solutions. The RVA analysis was done using a 28 gram total sample size at 5% ds. Heating profiles and RPM are indicated in the figures. RVA pH 6.5 solution (Cat. No. 6654-5, RICCA Chemical Company, Arlington, Tex., USA) and the certified buffer pH 3.5 solution (Key Laboratory Services, 2363 Federal Drive, Decatur, Ill.) were used.

Figure 2:
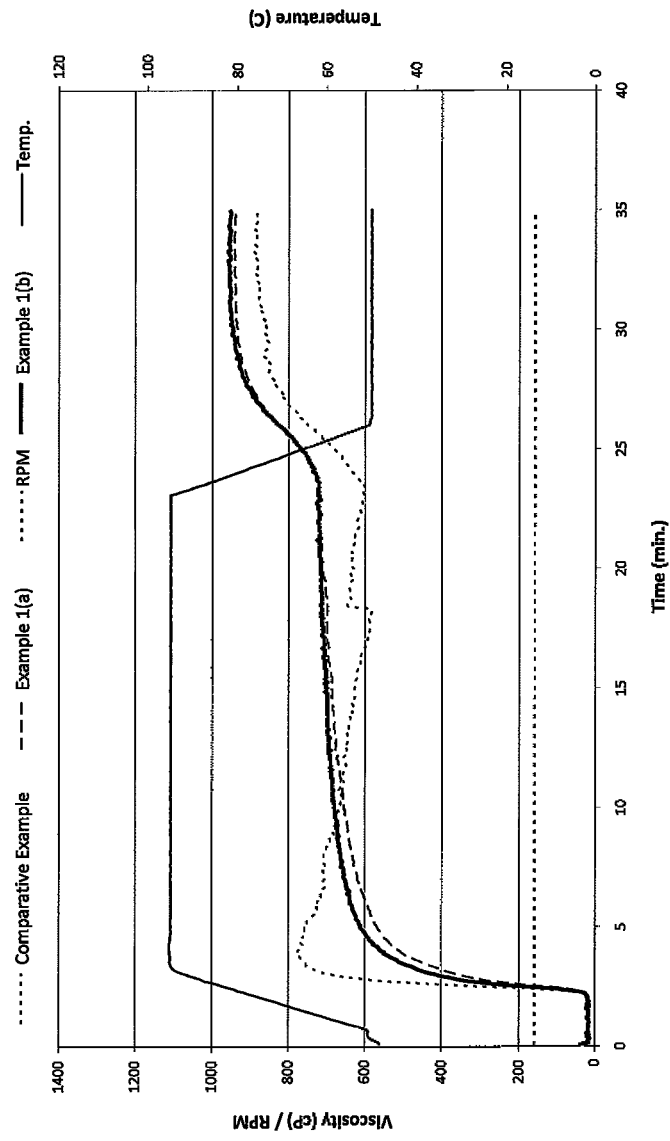
FIG. 2 shows the viscosity profiles for inhibited starch produced according to Example 1(a), protease-treated inhibited starch produced according to Example 1(b), and starch produced according to the Comparative Example at pH 3.5.

The results are shown in FIGS. 1 and 2.

Example 2

Colour Analysis

Example 2(a)

Preparation of an Inhibited Starch According to the Present Invention

In the wet-mill, partially refined waxy starch slurry was obtained from one of the several starch-washing steps during the final separation of proteins. This partially refined starch slurry (6349 g, 38.2% ds) had a higher protein content (1.56% dsb) when compared to purified waxy starch slurry (0.2% dsb). This slurry was transferred to a 6 L RB flask. The contents were warmed to 40° C. using a water bath. The pH of the slurry was adjusted to 9.5 by dropwise addition of NaOH (4% w/w) solution. A 14.3% w/w concentrated bleach solution (332.5 g, 1.96% dsb active chlorine) was added dropwise to the pH adjusted slurry. During hypochlorite addition, concentrated sulfuric acid solution (35% w/w) was added to maintain the reaction pH.

The pH was maintained at 9.5 throughout the reaction (2 h) by addition of NaOH (4% w/w) solution using a pH controller. After 2 h, the slurry pH was adjusted to 8 using concentrated $H_2SO_4$ (35% w/w) followed by the addition of sodium metabisulfite solution (0.2% dsb) to destroy the residual bleach. The contents were stirred for 30 min. During the metabisulfite addition, the pH of slurry dropped to pH 6.5. The slurry was filtered through a filter paper using a Buchner funnel under vacuum. The wet starch cake was washed with 2 volumes of DI water. The wet cake was dried in an oven at 50° C. overnight. The dried starch was pulverized using a Thomas Mill and screened through a 100 mesh screen.

Example 2(b)

Preparation of a Protease-treated Inhibited Starch According to the Present Invention A 38% w/w starch slurry was prepared by adding DI water (348 g) to the final product of Example 2(a) (220 g, ds=98%, protein=0.79%). The slurry was transferred to a 1 L RB flask and warmed to 50° C. using a water bath. The pH was adjusted to 8.0 using NaOH solution (4% w/w). Novozymes Alcalase protease (2.4 L Food Grade, 0.52 g) was added to the starch slurry. The pH was maintained at 8 during the course of the reaction (1 h 20 min). The bath temperature was lowered to 30° C. and the slurry pH was lowered to 3 using 2N HCl to deactivate the protease enzyme. The deactivation reaction time was 45 min. The slurry was filtered. The starch cake was washed with 1 volume of water. The wet cake was dried in an oven at 50° C. overnight. The dried starch was pulverized using the coffee grinder and screened through a 100 mesh screen to afford the final starch product.

Kjeldahl and Colour Analysis:

|  | Protein, % dsb | Colour (Yellowness Index) | Colour (Whiteness Index) |
| --- | --- | --- | --- |
| Example 2(a) | 0.725 | 14.36 | 38.17 |
| Example 2(b) | 0.298 | 11.72 | 45.16 |

Figure 3:
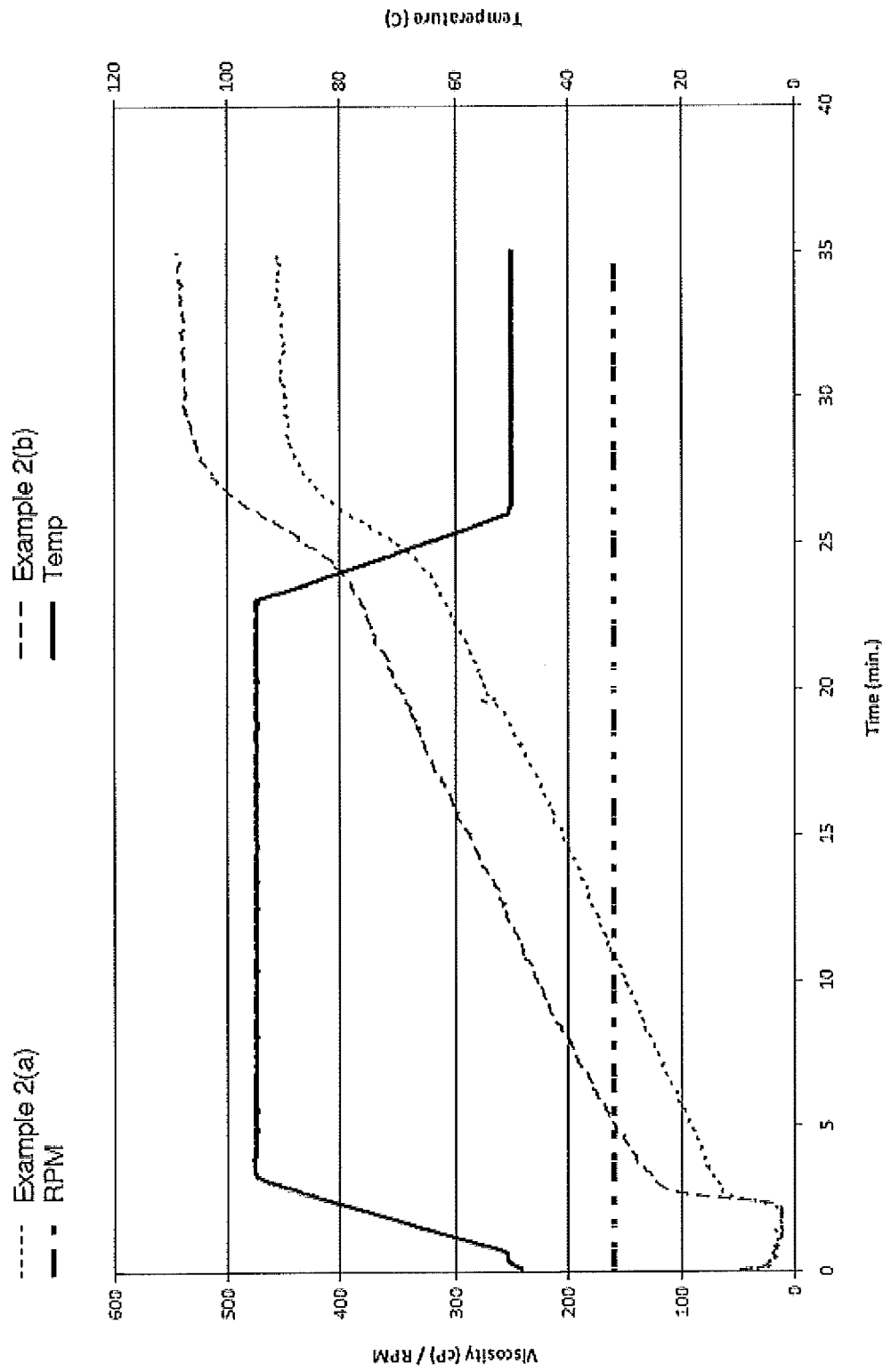
FIG. 3 shows the viscosity profiles for inhibited starch produced according to Example 2(a) and protease-treated inhibited starch produced according to Example 2(b) at pH 6.5.
Figure 4:
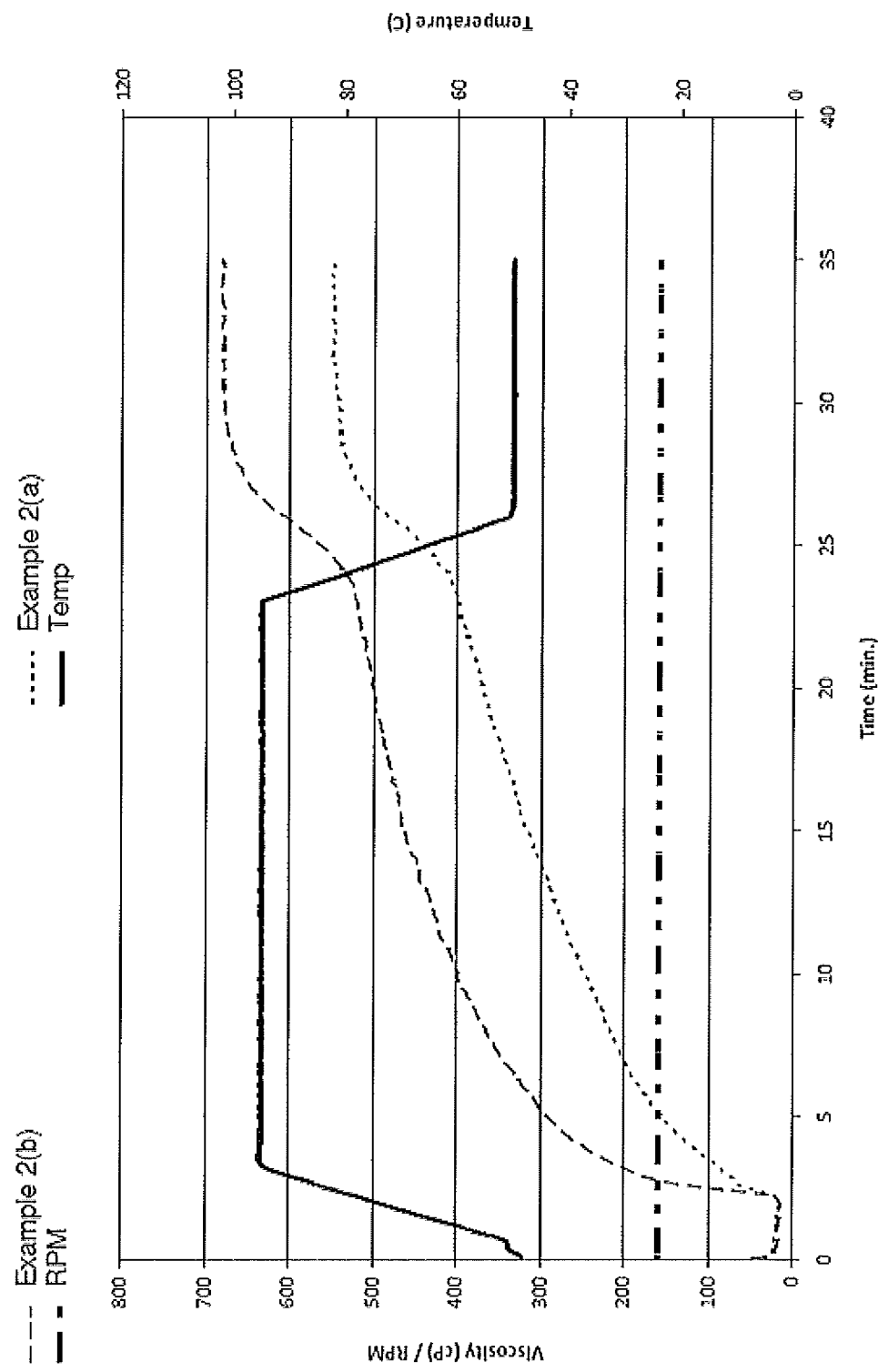
FIG. 4 shows the viscosity profiles for inhibited starch produced according to Example 2(a) and protease-treated inhibited starch produced according to Example 2(b) at pH 3.5.

Paste Viscosity Procedure:

Paste viscosity was measured using the same procedure as described in Example 1. The results are shown in FIGS. 3 and 4.

The invention claimed is:

1. A process for preparing an inhibited starch comprising, in order:
    a) extracting starch from a native source and partially refining to provide a partially refined starch having a residual protein content on a dry starch basis of more than 1.0% by weight and less than 8.0% by weight;
    b) treating said partially refined starch with a bleaching agent to provide an inhibited starch; and
    c) recovering said inhibited starch.

2. A process according to claim 1, further comprising, after said bleaching b):
    b') treating the inhibited starch with a protease to remove residual protein.

3. A process according to claim 1, wherein the residual protein content on a dry starch basis of the partially refined starch is more than 1.0% by weight and less than 4.0% by weight.

4. A process according to claim 1, wherein the residual protein content on a dry starch basis of the partially refined starch is more than 1.2% by weight and less than 3.0% by weight.

5. A process according to claim 1, wherein the residual protein content on a dry starch basis of the partially refined starch is more than 1.3% by weight and less than 2.5% by weight.

6. A process according to claim 1, wherein the partially refined starch having a residual protein content on a dry starch basis of more than 0.4% by weight and less than 8.0% by weight is obtained by mixing two or more starch streams of differing residual protein contents.

7. A process according to claim 6, wherein a partially refined starch stream is mixed with a refined starch stream.

8. A process according to claim 1, wherein the native source is waxy.

9. A process according to claim 8, wherein the native source is selected from the group consisting of waxy maize (corn), waxy rice, waxy wheat, waxy sorghum, waxy barley and waxy potato.

10. A process according to claim 9, wherein the native source is waxy maize (corn).

11. A process according to claim 1, wherein the bleaching agent comprises a source of active chlorine.

12. A process according to claim 11, wherein the bleaching agent comprises hypochlorite.

13. A process according to claim 12, wherein the hypochlorite is an alkali metal or alkaline earth metal hypochlorite.

14. A process according to claim 13, wherein the hypochlorite is sodium hypochlorite.

15. An inhibited starch obtained by the process according to claim 1.

16. A method for preparing a food product, wherein the method comprises using an inhibited starch according to claim 15.

17. A method according to claim 16, wherein the food product is an acidic food product.

18. A food product comprising an inhibited starch according to claim 15.

19. A food product according to claim 18, wherein the food product is an acidic food product.

20. A food product according to claim 18, wherein the food product is selected from the group consisting of high acid foods having a pH below 3.7, acid foods having a pH of from 3.7 to 4.5, low acid foods having a pH above 4.5, stove top-cooked foods, instant foods, pourable and spoonable salad dressings, refrigerated foods, frozen foods, microwaveable foods, liquid products, dry mixes, encapsulated flavours and clouds.

21. A food product according to claim 20, wherein the high acid foods are selected from the group consisting of fruit-based pie fillings, and baby foods; the acid foods are selected from the group consisting of tomato-based products; the low acid foods are selected from the group consisting of gravies, sauces, and soups; the stove top-cooked foods are selected from the group consisting of sauces, gravies, and puddings; the instant foods are selected from the group consisting of puddings; the refrigerated foods are selected from the group consisting of dairy and imitation dairy products; the frozen foods are selected from the group consisting of frozen desserts and dinners; the microwaveable foods are selected from the group consisting of frozen dinners; the liquid products are selected from the group consisting of diet products and hospital foods; and the dry mixes are selected from the group consisting of dry mixes for preparing baked goods, gravies, sauces, puddings, baby foods, hot cereals, and dry mixes for predusting foods prior to batter cooking and frying.

22. A food product according to claim 20, wherein the food product is selected from the group consisting of high acid foods having a pH below 3.7, acid foods having a pH of from 3.7 to 4.5, low acid foods having a pH above 4.5, stove top-cooked foods, instant foods, pourable and spoonable salad dressings, refrigerated foods, frozen foods, and microwaveable foods.

23. A non-food product comprising an inhibited starch according to claim 5.

24. A non-food product according to claim 23, wherein the non-food product is selected from the group consisting of cosmetic and personal care products, paper, packaging, pharmaceutical, formulations, and adhesives.

* * * * *